United States Patent
Shiihara

(10) Patent No.: US 10,284,451 B2
(45) Date of Patent: May 7, 2019

(54) MANAGEMENT APPARATUS FOR MANAGING NETWORK DEVICE AND METHOD FOR CONTROLLING THE SAME

(71) Applicant: CANON KABUSHIKI KAISHA, Tokyo (JP)

(72) Inventor: Takeshi Shiihara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 287 days.

(21) Appl. No.: 14/716,716

(22) Filed: May 19, 2015

(65) Prior Publication Data
US 2015/0341249 A1 Nov. 26, 2015

(30) Foreign Application Priority Data
May 21, 2014 (JP) .................................. 2014-105626

(51) Int. Cl.
H04L 12/26 (2006.01)
G06F 17/30 (2006.01)
H04L 29/06 (2006.01)
G06F 9/451 (2018.01)
G06F 9/44 (2018.01)

(52) U.S. Cl.
CPC ............ *H04L 43/10* (2013.01); *G06F 9/4443* (2013.01); *G06F 9/451* (2018.02); *G06F 17/30893* (2013.01); *H04L 67/42* (2013.01)

(58) Field of Classification Search
CPC . H04L 67/42; G06F 9/4443; G06F 17/30893; G06F 43/10; G06F 67/42; G06F 3/1246; G06F 17/30896; G06F 17/30905; G06F 21/128; H04N 21/2355

USPC .............................................. 358/1.13, 1.15
See application file for complete search history.

(56) References Cited

U.S. PATENT DOCUMENTS

| 9,043,761 | B2* | 5/2015 | Artzi | G06F 11/3692 717/124 |
| 2011/0164268 | A1* | 7/2011 | Hirai | H04N 1/00 358/1.13 |
| 2011/0258631 | A1* | 10/2011 | Ohashi | H04L 41/082 718/102 |
| 2012/0054553 | A1* | 3/2012 | Artzi | G06F 11/3688 714/38.1 |
| 2012/0066135 | A1* | 3/2012 | Garst | G06F 9/468 705/59 |
| 2012/0079081 | A1* | 3/2012 | Parks | G06F 3/1204 709/220 |

(Continued)

FOREIGN PATENT DOCUMENTS

JP 2007-086891 A 4/2007

*Primary Examiner* — Philip J Chea
*Assistant Examiner* — Ruth Solomon
(74) *Attorney, Agent, or Firm* — Canon U.S.A., Inc. I.P. Division

(57) ABSTRACT

A server manages a script and a task, the script being a command via a web page provided by a network device, and the task designating a timing of execution of the script. In a case where the server detects a change in a configuration of the web page provided by the network device, the server controls execution of the script of the task according to the detected change. In a case where the detected change indicates that a web page element to be an operation target by the script of the managed task has been deleted, the server stops the execution of the script.

11 Claims, 19 Drawing Sheets

(56) References Cited

U.S. PATENT DOCUMENTS

| | | | |
|---|---|---|---|
| 2012/0331376 A1* | 12/2012 | Gorokhovsky | G06F 17/30899 715/234 |
| 2013/0050728 A1* | 2/2013 | Ito | G06K 15/005 358/1.13 |
| 2013/0247055 A1* | 9/2013 | Berner | G06Q 10/00 718/102 |
| 2013/0326333 A1* | 12/2013 | Hashmi | G06F 17/2247 715/234 |
| 2014/0029049 A1* | 1/2014 | Takahashi | H04N 1/00973 358/1.15 |

* cited by examiner

FIG. 3

```
010:// ScriptName:XXX
011:// ScriptType:WriteTask
012:// CreateDate:Dec 10, 20xx
***
101:***
102:{
103:  "action":"login",
104:  "userId":@Param1@,
105:  "password":@Param2@
106:},{
107:  "action":"pageMove",
108:  "url":"/portal/additional_unit_status"
109:},{
110:  "action":"getValue",
111:  "htmlPath":"//div[@id='contents']/li[0]/span[0]",
112:  "valueType":"Integer"
113:},{
114:  "action":"pageMove",
115:  "url":"/portal/application_management"
116:},{
117:  "action":"click",
118:  "htmlPath":"//xxx/button[0]",
119:  "waitTime":3000
120:***
```

400

FIG. 4A  VENDOR MANAGEMENT TABLE

| VENDOR IDENTIFIER | VENDOR NAME |
|---|---|
| 1 | A Inc. |
| 1 | B Inc. |

300

FIG. 4B  PRODUCT MODEL MANAGEMENT TABLE

| PRODUCT MODEL IDENTIFIER | VENDOR IDENTIFIER | PRODUCT IDENTIFICATION NAME | FIRMWARE VERSION |
|---|---|---|---|
| 1 | 1 | Model A | 10.123.4 |
| 2 | 1 | Model A | 20.123.4 |
| 3 | 2 | Model B | 30.01.0 |
| 4 | 2 | Model B | 30.20.0 |

301

FIG. 4C  APPLICATION MANAGEMENT TABLE

| APPLICATION IDENTIFIER | APPLICATION NAME | VENDOR IDENTIFIER | VERSION |
|---|---|---|---|
| 1 | APPLICATION 1 | 1 | 1.0.1 |
| 2 | APPLICATION 2 | 2 | 2.0.0 |
| 3 | APPLICATION 3 | 2 | 1.1.0 |

302

FIG. 4D  OPTIONAL DEVICE MANAGEMENT TABLE

| OPTIONAL DEVICE IDENTIFIER | VENDOR IDENTIFIER | OPTIONAL PRODUCT NAME |
|---|---|---|
| 1 | 1 | Option A |
| 2 | 1 | Option Ax |
| 3 | 2 | Option B |

SCRIPT MANAGEMENT TABLE

| SCRIPT IDENTIFIER | SCRIPT NAME | PRODUCT MODEL IDENTIFIER | OPTIONAL DEVICE IDENTIFIER | APPLICATION IDENTIFIER | SCRIPT DATA |
|---|---|---|---|---|---|
| 1 | Script A | 1 | 1,2 | 1 | File:/script/sc1.js |
| 2 | Script B | 2 | 1 | 1 | File:/script/sc2.js |
| 3 | Script C | 3 | 2 | 2,3 | File:/script/sc3.js |
| 4 | Script D | 4 | 3 | 3 | File:/script/sc4.js |
| 5 | Script E | 3 | 3 | 2 | File:/script/sc5.js |
| 6 | Script F | 1 | 1,2 | 1 | File:/script/sc6.js |
| 7 | Script G | 2 | 1 | 1 | File:/script/sc7.js |
| 8 | Script H | 3 | 2 | 2,3 | File:/script/sc8.js |
| 9 | Script I | 4 | 3 | 3 | File:/script/sc9.js |

DEVICE MANAGEMENT TABLE

| NETWORK DEVICE IDENTIFIER | DEVICE NAME | USER ACCOUNT | PASSWORD | PRODUCT MODEL IDENTIFIER | IP ADDRESS | HTTP PORT NUMBER | SERIAL NUMBER | LATEST SEARCH DATE AND TIME |
|---|---|---|---|---|---|---|---|---|
| 1 | Device 1 | admin_A | ****** | 1 | 192.168..** | 80 | xxxxxxx | 2013/6/1 8:00 |
| 2 | Device 2 | admin_B | ****** | 2 | 192.168..** | 80 | xxxxxxx | 2013/6/5 10:00 |
| 3 | Device 3 | admin_C | ****** | 3 | 192.168..** | 80 | xxxxxxx | 2013/6/8 15:00 |
| 4 | Device 4 | admin_D | ****** | 3 | 192.168..** | 80 | xxxxxxx | 2013/6/8 9:00 |

Web SCRAPING TASK MANAGEMENT TABLE

| TASK IDENTIFIER | TASK NAME | EXECUTION CATEGORY | TASK EXECUTION INTERVAL | NEXT EXECUTION DATE AND TIME | NETWORK DEVICE IDENTIFIER | NEXT EXECUTION SCRIPT IDENTIFIER | TASK CATEGORY | EXECUTION FLAG |
|---|---|---|---|---|---|---|---|---|
| 1 | TASK A | ROUTINE EXECUTION | 10 MINUTES | 2013/6/20 10:10 | 3 | 3 | READ | FALSE |
| 2 | TASK B | ROUTINE EXECUTION | ONE WEEK | 2013/6/27 9:45 | 1 | 1 | READ&WRITE | TRUE |
| 3 | TASK C | ROUTINE EXECUTION | ONE MONTH | 2013/7/25 9:55 | 2 | 2 | READ | FALSE |
| 4 | TASK D | INSTANT EXECUTION | -- | 2013/6/20 6:10 | 4 | 4 | WRITE | TRUE |

Web SCRAPING TASK EXECUTION RESULT MANAGEMENT TABLE

| TASK EXECUTION RESULT IDENTIFIER | TASK IDENTIFIER | EXECUTION DATE AND TIME | TASK EXECUTION RESULT | EXECUTION SCRIPT IDENTIFIER | EXECUTION LOG DATA |
|---|---|---|---|---|---|
| 1 | 2 | 2013/6/20 9:45 | SUCCESS | 1 | — |
| 2 | 1 | 2013/6/20 9:50 | FAILURE | 3 | File:/err_130620xx.log |
| 3 | 3 | 2013/6/20 9:55 | FAILURE | 2 | File:/err_130620xx.log |
| 4 | 1 | 2013/6/20 10:00 | SUCCESS | 5 | — |

Web UI INFORMATION MANAGEMENT TABLE

| Web UI INFORMATION IDENTIFIER | Web UI HIERARCHY DATA | Web UI HTML DATA | ACQUISITION DATE AND TIME |
|---|---|---|---|
| 1 | File:/web_ui/pageinfoA.txt | File:/web_ui/htmldata_A.txt | 2013/6/15 9:00 |
| 2 | File:/web_ui/pageinfoB.txt | File:/web_ui/htmldata_B.txt | 2013/6/16 13:00 |
| 3 | File:/web_ui/pageinfoC.txt | File:/web_ui/htmldata_C.txt | 2013/6/17 8:00 |
| 4 | File:/web_ui/pageinfoD.txt | File:/web_ui/htmldata_D.txt | 2013/6/18 21:00 |
| 5 | File:/web_ui/pageinfoE.txt | File:/web_ui/htmldata_E.txt | 2013/6/19 6:00 |

Web UI MONITORING TASK MANAGEMENT TABLE

| MONITORING TASK IDENTIFIER | EXECUTION CATEGORY | EXECUTION INTERVAL | NEXT EXECUTION DATE AND TIME | NETWORK DEVICE IDENTIFIER | NEXT EXECUTION SCRIPT IDENTIFIER | MONITORING AREA PATH | MONITORING AREA COORDINATES | MONITORING KEYWORD | RELEVANT TASK IDENTIFIER | NOTIFICATION LEVEL |
|---|---|---|---|---|---|---|---|---|---|---|
| 1 | ROUTINE EXECUTION | 1 MINUTE | 2013/6/20 10:02 | 1 | 6 | /body/div/from[0] | - | IS&&VALID | 2 | 3(Critical) |
| 2 | ROUTINE EXECUTION | 1 MINUTE | 2013/6/20 10:02 | 3 | 8 | - | X:0,Y:150-X:20,Y:200 | TEMPERATURE:50-100°C | 4 | 1(Important) |
| 3 | ROUTINE EXECUTION | TEN MINUTES | 2013/6/20 10:10 | 2 | 7 | /body/div[1]/div[3] | - | - | - | 1(Important) |
| 4 | INSTANT EXECUTION | - | 2013/6/20 12:00 | 4 | 9 | /body/div[3]/p/a[3] | - | - | - | 3(Critical) |

Web UI MONITORING TASK EXECUTION RESULT MANAGEMENT TABLE

| MONITORING TASK EXECUTION RESULT IDENTIFIER | MONITORING TASK IDENTIFIER | EXECUTION DATE AND TIME | MONITORING TASK EXECUTION RESULT | EXECUTION LOG DATA |
|---|---|---|---|---|
| 1 | 2 | 2013/6/20 10:00 | NO CHANGE | File:/err_130620xx.log |
| 2 | 1 | 2013/6/20 10:00 | NO CHANGE | File:/err_130620xx.log |
| 3 | 2 | 2013/6/20 10:01 | NO CHANGE | File:/err_130620xx.log |
| 4 | 1 | 2013/6/20 10:01 | AREA CHANGE DETECTED | File:/err_130620xx.log |

310

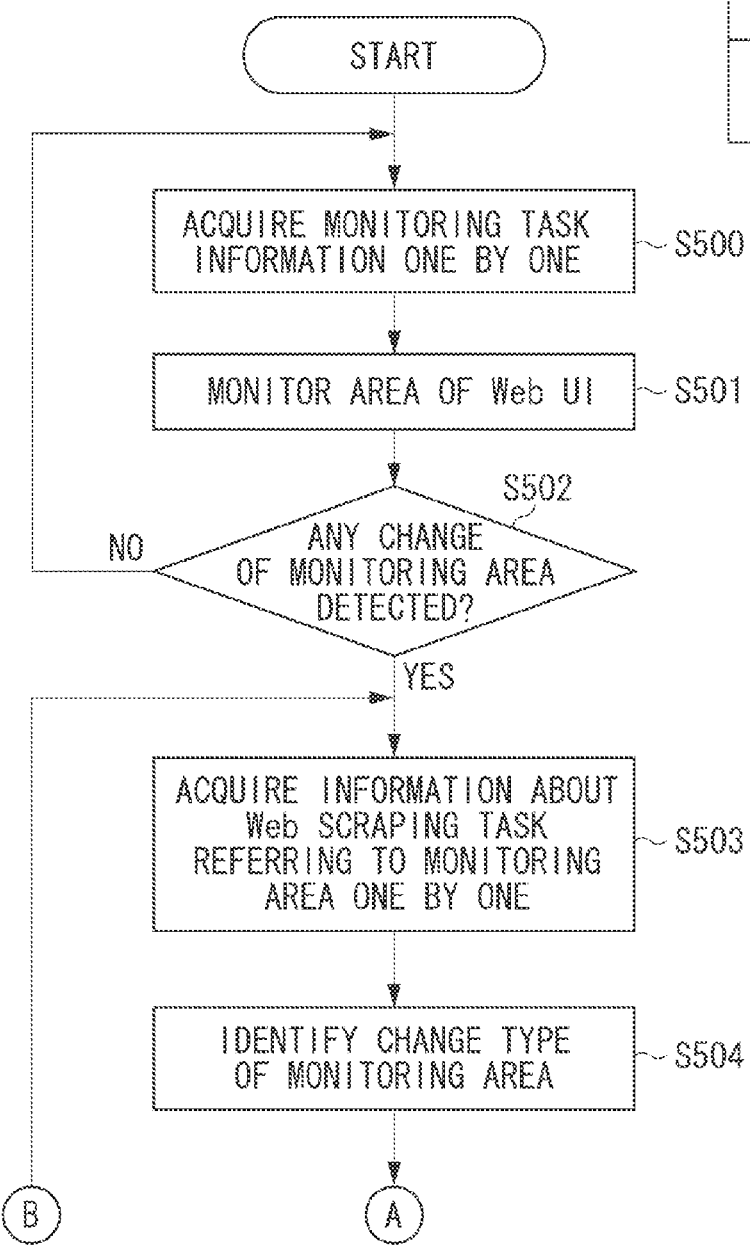

FIG. 11

```
<html>
<body>
<div id="navGeneral">
<h3 class="GroupTitle">Settings</h3>
<ul>
    <li class="Main"> 601
        <a class="Standby Appl_1" href="/box"><span class="Name">Access Received/Stored Files</span></a> 602
    </li>
    <li class ="Main">
        <a class="Standby Appl_2" href="/address"><span class="Name">Address Book</span></a>
    </li>
    <li class ="Main">
        <a class="Standby Appl_3" href="/custommenu"><span class="Name">Quick Menu</span></a>
    </li>
    <li class="Main">
        <a class="Standby Appl_4" href="/uactrl"><span class="Name">User Access Control for Advanced Box</span></a>
    </li>
    <li class="Main">
        <a class="Standby Appl_7" href="/direct"><span class="Name">Direct Print</span></a>
    </li>
</ul>
</div>
</body>
</html>
```

600

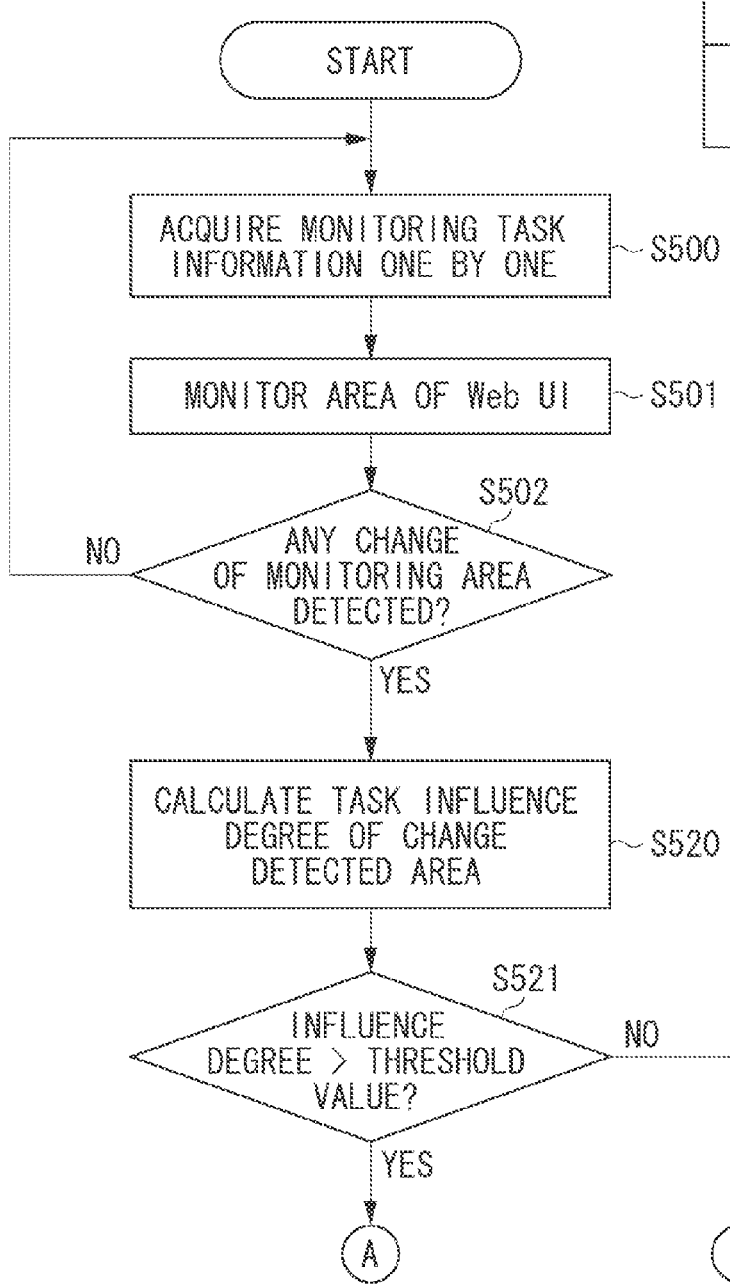

MANAGEMENT APPARATUS FOR MANAGING NETWORK DEVICE AND METHOD FOR CONTROLLING THE SAME

BACKGROUND OF THE INVENTION

Field of the Invention

The present invention relates to a management apparatus for managing a network device and a method for controlling the management apparatus.

Description of the Related Art

There is a conventional method for causing a management server for managing a network device to remotely operate a plurality of network devices by using web user interfaces (web UIs) of respective network devices. In this case, the management server manages each network device by operating the web UI in such a way as to simulate a web browser operation (e.g., a keyboard input operation or a click operation) of each client. The management server accesses the web UI, and the management server collects many pieces of information (e.g., status and setting information of each network device). For example, the management server can install various applications and change various setting values for high-performance multifunction peripherals dedicated to offices. Japanese Patent Application Laid-Open No. 2007-86891 discusses a system in which an integrated server processes a request from a client according to a scenario, thereby simulating a web browser operation of the client and facilitating an application operation.

Further, in a case where the management server manages a plurality of network devices, the management server writes a web UI operation procedure to an external file and manages a script for each model. The script includes a description about a procedure of each web UI operation (e.g., a page transition operation, a keyboard input operation, or a mouse operation). The management server reads an associated script from unique information of the network device and operates the web UI according to a described operation procedure. Therefore, a processing logic dedicated to each network device can be separated as an execution program and the efficiency in the individual management of each network device can be improved.

In a network device, the web UI may change due to an update of its firmware, a connection establishment with an external device, or the like. If a Hyper Text Markup Language (HTML) structure of the web UI is changed, the management server cannot appropriately execute an existing web UI operation task, and if the task is forcibly executed, the network device may perform an operation not intended by a task creator.

SUMMARY OF THE INVENTION

The present invention is directed to a management apparatus that can appropriately control a task for a network device, in a case where a change in a configuration of a web UI of the network device occurs, according to content of the change.

According to an aspect of the present invention, a management apparatus for managing a network device, the management apparatus includes a management unit configured to manage a script and a task, the script being a command, required for an operation to a network device, via a web page provided by the network device, and the task designating a timing of execution of the script, a detection unit configured to detect a change in a configuration of the web page provided by the network device, and a control unit configured to control execution of a script of the managed task, according to the change detected by the detection unit. The control unit, in a case where the change detected by the detection unit indicates that a web page element to be an operation target by the script of the managed task has been deleted, stops execution of the script.

Further features of the present invention will become apparent from the following description of exemplary embodiments with reference to the attached drawings.

BRIEF DESCRIPTION OF THE DRAWINGS

FIG. 3 is a diagram illustrating a description example of a script that can be used by an application server.

FIGS. 4A, 4B, 4C, and 4D are diagrams illustrating various table configurations that are managed by a database server module.

FIGS. 5A and 5B are diagrams illustrating various table configurations that are managed by the database server module.

FIGS. 6A, 6B, and 6C are diagrams illustrating various table configurations that are managed by the database server module.

FIGS. 7A and 7B are diagrams illustrating various table configurations that are managed by the database server module.

FIG. 10 is a diagram including the flowcharts of FIGS. 10A and 10B. FIGS. 10A and 10B are flowcharts illustrating task processing according to the first exemplary embodiment.

FIG. 11 is a diagram illustrating an HTML document for a web UI.

FIG. 13 a diagram including the flowcharts of FIGS. 13A and 13B. FIGS. 13A and 13B are flowcharts illustrating task processing according to a second exemplary embodiment.

DESCRIPTION OF THE EMBODIMENTS

An exemplary embodiment of a network system that includes a management apparatus for managing a network device according to the present invention will be described in detail below. The management apparatus described in the present exemplary embodiment is an application server. Further, the network device is a multifunction peripheral (MFP) or a copying machine having multiple functions. The network device may be a printer, a facsimile machine, or any device other than the MFP.

Further, the following description employs a technical term "web scraping" describing that a program included in the management apparatus operates a network device's web UI and performs analysis and information extraction. In the following description, the web scraping includes processing for operating the web UI according to a script description procedure and analyzing the HTML to extract information about a network device. The program simulates input processing, such as a mouse operation or a keyboard operation, to operate the web UI. The web scraping is used for, for example, an operation in which various settings of a network device is changed to arbitrary values, an operation in which an application, a license file (e.g., certificate), and the like are installed by using a file upload function, or the like. Further, the web scraping is used for periodically acquiring various states of a network device via the web UI to monitor an operational state of a network device. The present invention is not limited to the above-mentioned exemplary usages.

Figure 1:
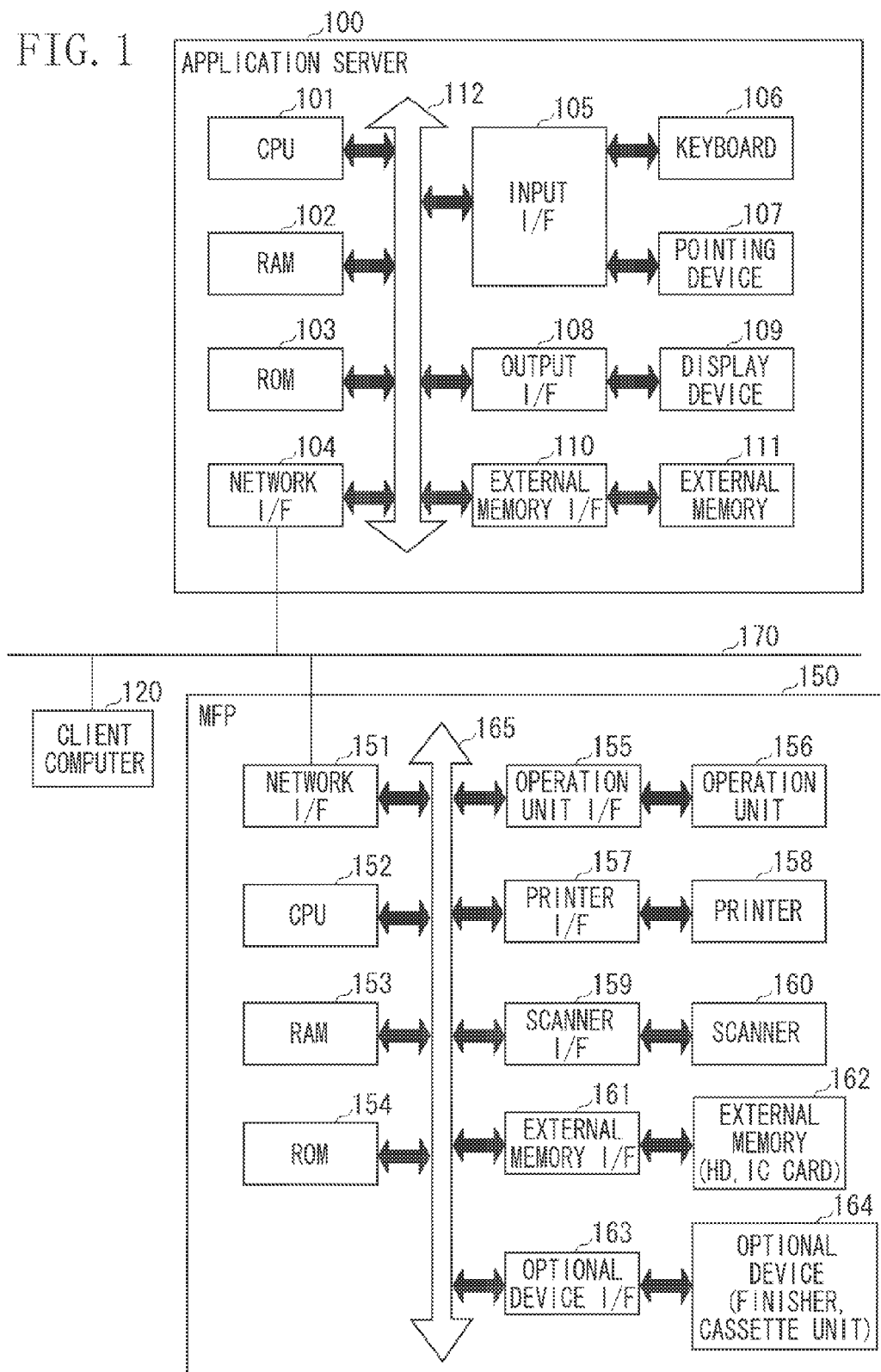
FIG. 1 is a block diagram illustrating an entire configuration and a hardware configuration of a network system according to a first exemplary embodiment of the present invention.

FIG. 1 is a block diagram illustrating an entire configuration and a hardware configuration of a network system according to an exemplary embodiment. The network system includes an application server 100, a client computer 120, and a multifunction peripheral (MFP) 150. The apparatuses are connected to each other via a network 170 so that the apparatuses mutually transmit and receive data and information. Each of the application server 100 and the client computer 120 is configured as a general computer. A hardware configuration of the client computer 120 is similar to that of the application server 100 and therefore redundant description thereof will be avoided.

The application server 100 includes a central processing unit (CPU) 101 through a system bus 112. The CPU 101 performs processing based on an application program and the like stored in a read only memory (ROM) 103 or in an external memory 111. The CPU 101 controls each device connected to the system bus 112 as an overall manner. Further, the CPU 101 opens various application windows having been registered based on a command instructed with a mouse cursor (not illustrated) on a display device 109, and performs various data processing.

A random access memory (RAM) 102 functionally operates as a main memory or a work area for the CPU 101. The ROM 103 functionally operates as a storage area of a basic input/output (I/O) program. The ROM 103 or the external memory 111 stores an operating system program (hereinafter, referred to as "OS") and the like, which is a control program required for the CPU 101. Further, the ROM 103 or the external memory 111 stores files and other various data that are used when the CPU 101 performs processing based on the application programs.

A network interface (I/F) 104 performs a network communication with each apparatus when the network I/F 104 is connected to the network 170. An input I/F 105 controls an input via a keyboard 106 and/or a pointing device 107 (e.g. a mouse). An output I/F (i.e., a display I/F) 108 controls display on the display device 109. An external memory I/F 110 controls access to the external memory 111, such as a hard disk (HD). The external memory 111 stores a boot program, various software applications, user files, and edited files.

The application server 100 operates in a state where the CPU 101 runs the basic I/O program and the OS written in the ROM 103 or the external memory 111. The basic I/O program has an initial program loading function, according to which the OS is loaded into the RAM 102 from the ROM 103 or the external memory 111 in response to a turning-on operation of a power source of the computer so that the OS starts its operation. The devices are connected with each other by the system bus 112.

The MFP 150 includes a network I/F 151 through a system bus 165. The network I/F 151 performs a network communication with each apparatus in a state where the network I/F 151 is connected to the network 170. The CPU 152 performs various processing based on application programs stored in a ROM 154 or in an external memory 162. For example, the CPU 152 communicates with the application server 100 via the network I/F 151 to transmit various information in the MFP 150. Further, the CPU 152 outputs an image signal as output information to a printer 158 via a printer I/F 157, which is connected to the system bus 165, based on a control program and the like. The control program is stored in the ROM 154 or in the external memory 162.

The RAM 153 functionally operates as a main memory or a work area for the CPU 152. The memory capacity of the RAM 153 can be expanded by using an option RAM connected to an extension port (not illustrated). Further, the RAM 153 is used for an output information development area, an environment data storing area, a nonvolatile random access memory (NVRAM), or the like.

The ROM 154 or the external memory 162 (e.g., a hard disk (HD) or an IC card) stores a control program and an application program of the CPU 152, font data to be used when the above-mentioned output information is generated, and information that is used in the MFP 150. Further, the ROM 154 or the external memory 162 temporarily stores an application when it is installed by the MFP 150.

An operation unit I/F 155 serves as an interface for an operation unit 156 and outputs image data to be displayed to the operation unit 156. Further, the operation unit I/F 155 receives information input via the operation unit by a user. The operation unit 156 corresponds to an operation panel and the like on which operation switches and a light emitting diode (LED) display device are disposed.

The printer I/F 157 outputs an image signal, as output information, to the printer 158 (i.e., a printer engine). A scanner I/F 159 receives an image signal, as input information, from a scanner 160 (i.e., a scanner engine).

An external memory I/F 161 (i.e., a memory controller) controls access to the external memory 162, such as a hard disk (HD) or a IC card. The above-mentioned external memory is not limited to only one memory. For example, it is useful to connect a plurality of external memories that stores an option font card or a program capable of interpreting different printer control languages in addition to built-in fonts. Further, the MFP 150 may include an NVRAM (not illustrated) and may be configured to store printer mode setting information received via the operation unit 156.

An optional device I/F 163 controls access to an optional device 164, such as a finisher or a cassette unit. The optional device 164 is not limited to the finisher or the cassette unit and may be any peripheral device (e.g., a camera or an IC card reader) capable of expanding MFP functions and mechanisms. The system bus 165 connects the devices with each other.

Figure 2:
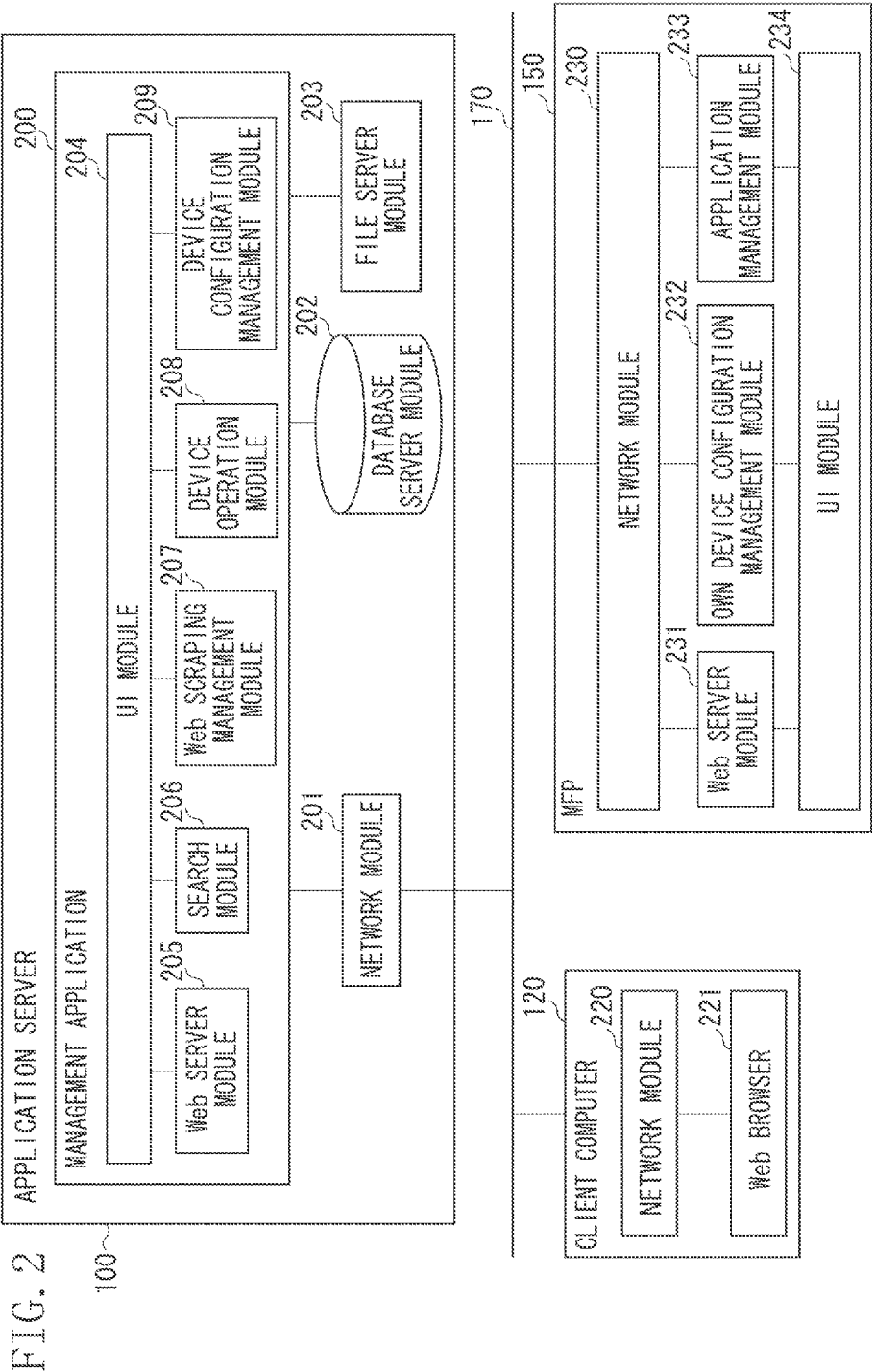
FIG. 2 is a diagram illustrating a software configuration of the system illustrated in FIG. 1.

FIG. 2 is a block diagram illustrating a software configuration of the network system illustrated in FIG. 1. A software configuration of the application server 100 will be described.

The application server 100 includes a management application 200, a network module 201, a database server module 202, and a file server module 203. The management application 200 and each module are present as files stored in the external memory 111 and are program modules that are loaded into the RAM 102 and executed by the OS or any module that uses the module. Further, the management application 200 can be added to an external memory via a CD-ROM (not illustrated) of the external memory 111 or the network 170.

The network module 201 performs a network communication with the client computer 120 and the MFP 150 by using an arbitrary communication protocol. If a web server module 205 receives an HTTP request from a web browser 221 of the client computer 120, the web server module 205 transmits an HTTP response as a web server service. For example, the HTTP response transmitted by the web server module 205 includes web page data stored in the external memory 111. Alternatively, the web server module 205 requests an UI module 204 of the management application 200 to generate an HTTP response.

The management application 200 includes the UI module 204, the web server module 205, a search module 206, a web scraping management module 207, a device operation module 208, and a device configuration management module 209. The management application 200 is an application that manages the MFP 150 connected to the application server 100 via the network 170. The management application 200 is implemented as a program that performs processing in response to, for example, a web page request that is provided by the web server module 205. As mentioned above, the management application 200 and the web server module 205 cooperatively realize a web application that manages the MFP 150.

The UI module 204 generates an HTTP response in response to a request from the web server module 205. Further, the UI module 204 receives user input information from the web browser 221 of the client computer 120, and calls each module if necessary. The module called by the UI module 204 in this case is, for example, the web server module 205, the search module 206, the web scraping management module 207, or the device configuration management module 209. Further, the UI module 204 may call a module other than the above-mentioned modules.

The search module 206 searches for the MFP 150, which is connected to the application server 100 via the network 170, by using an arbitrary communication protocol. The communication protocol used by the search module 206 for the search is, for example, Simple Network Management Protocol (SNMP) or Service Location Protocol (SLP). Further, Web Services Dynamic Discovery (WS-Discovery) or any other appropriate communication protocol may be used. The search module 206 searches for the MFP 150 and acquires device information from the MFP 150. Then, The search module 206 stores the acquired device information in a device management table 305 of the database server module 202.

The web scraping management module 207 transmits an HTTP request to the MFP 150 via the network 170 and transmits arbitrary data to the MFP 150. Further, the web scraping management module 207 receives an HTTP response generated by a web server module 231 of the MFP 150, and extracts specific information by analyzing an HTML description of the received response.

Further, the web scraping management module 207 acquires task information from a task management table 306 of the database server module 202 described below. Subsequently, the web scraping management module 207 acquires a script stored in the database server module 202 or the file server module 203 based on the task information. The web scraping management module 207 reads the acquired script and operates a web UI, which is provided by the web server module 231 of the MFP 150, according to a described command. For example, the web UI operation includes an operation for web page transition by designation of a uniform resource locator (URL), a keyboard input operation using an input format, a mouse click operation, and an operation for extracting specific information by searching for a specific character string from an HTML description and performing comparison.

FIG. 3 is a diagram illustrating a description example of a script. The example illustrated in FIG. 3 is an example script of the above-mentioned operation command using JavaScript (registered trademark) Object Notation (JSON) format. Extensible Markup Language (XML) or other description formats are also usable for the description of the script. The web scraping management module 207 reads the above-mentioned description and executes a web UI operation. Further, the script can designate a waiting time between operations so that an operation can be performed at an arbitrary timing.

Referring back to FIG. 2, the device operation module 208 performs a setting change operation for the MFP 150 based on a user input. The setting change operation includes, for example, an operation for updating a firmware of the MFP 150, an operation for installing or uninstalling application software to or from the MFP 150, and an operation for invalidating or validating various functions installed on the MFP 150. In addition to the above-mentioned operations, the setting change operation can include any other appropriate operation to change the settings of the MFP 150. The above-mentioned processing (e.g., update of the firmware and installation/uninstallation of each application) can be performed as task processing of which execution date and time is designated.

Further, the device operation module 208 acquires task information from an application management table 302 and an application installation task management table (not illustrated) of the database server module 202. In this case, it is assumed that the data required in the firmware update and application installation processing is stored in the file server module 203.

The file server module 203 manages various files, and stores and/or retrieves a file in response to a request from another module. The file server module 203 may be configured as a device separated from the application server 100 as long as the file server module 203 is accessible from the management application 200. In a case where file transmission/reception processing via the network 170 is performed, File Transfer Protocol (FTP) Web-based Distributed Authoring and Versioning (WebDAV) protocol, or the like is usable.

The database server module 202 manages various data, and stores and/or retrieves data in response to a request from another module. The database server module 202 can be configured as a device separated from the application server 100 as long as the database server module 202 is accessible from the management application 200.

The device configuration management module 209 manages configuration information about the MFP 150. For example, the configuration information includes product name of the MFP 150 and vendor information thereof as well as firmware version information about the MFP 150. The configuration information further includes an identification name of application installed on the MFP 150 together with version information thereof and includes a product name of optional device connected to the MFP 150 together with vendor information thereof. The configuration information may be any other configuration information as long as it represents hardware and/or software information about the MFP 150. The above-mentioned configuration information is stored in a vendor management table 300, a product model management table 301, the application management table 302, an optional device management table 303, and the device management table 305 of the database server module 202. The device configuration management module 209 manages the configuration information about the MFP 150 by reading and writing the above-mentioned table information.

A software configuration of the client computer 120 will be described. The client computer 120 includes a network module 220 and the web browser 221. Each module constituting the client computer 120 is a program module that is present as a file stored in the ROM 103 or the external memory 111. Each module is loaded into the RAM 102 and executed by the OS or any module that uses the module in execution. The network module 220 performs a network communication with the application server 100 and the MFP 150 by using an arbitrary communication protocol. The web browser 221 transmits an HTTP request message via the network module 220. Then, the web browser 221 receives and displays an HTTP response message. Access from the client computer 120 to the application server 100 is performed via the web browser 221.

A software configuration of the MFP 150 will be described. The MFP 150 includes a network module 230, the web server module 231, an own device configuration management module 232, an application management module 233, and a UI module 234. Each of the modules is present as a file stored in the ROM 154 or the external memory 162 and can be loaded into the RAM 153 and executed by the OS or any module that uses the module. The network module 230 performs a network communication with the application server 100 and the client computer 120 by using an arbitrary communication protocol.

The web server module 231 receives HTTP requests from the web scraping management module 207 of the management application 200 and the web browser 221 of the client computer 120, the web server module 231 transmits an HTTP response to the web scraping management module 207 and the web browser 221. For example, the HTTP response to be transmitted from the web server module 231 can include web page data stored in the external memory 111. Alternatively, the web server module 231 requests the UI module 204 of the management application 200 to generate an HTTP response.

The own device configuration management module 232 manages hardware configuration information and software configuration information about the MFP 150. For example, the hardware configuration information includes own device unique information (e.g., manufacturer's serial number and manufacturing site of own device) as well as product information and an usage state of optional device connected to the MFP 150. The finisher and the cassette unit are examples of an optional device. In a case where an optional device includes consumables and components or elements that are worn out (e.g., toner and hinges), the own device configuration management module 232 acquires information about a consumed state and a wear-out state and notifies the management application 200 of the acquired information via the network module 230 and the network 170. The software configuration information includes, For example, firmware information about the MFP 150 and installed application information.

Further, the own device configuration management module 232 receives a firmware update request transmitted from the device operation module 208 of the management application 200. Further, the own device configuration management module 232 receives an application installation request via the network module 230. The own device configuration management module 232 then updates its own firmware and installs the requested application. The application management module 233 manages built-in applications and various applications that are installed. The UI module 234 receives a user input value having been input via a UI rendering displayed on the operation unit 156 of the MFP 150 or a user UI operation on the operation unit 156.

FIGS. 4A to 4D through FIGS. 7A and 7B illustrate various examples of table configurations in the database server module 202. The illustrated table configurations are mere examples and different table configurations are employable.

FIGS. 4A to 4D are diagrams illustrating table configuration examples of the vendor management table 300, the product model management table 301, the application management table 302, and the optional device management table 303, respectively. The vendor management table 300 illustrated in FIG. 4A is a table that is used by the device configuration management module 209 to manage vendor information (e.g., manufacturing vendor name of the MFP 150). Further, in the vendor management table 300, vendor information about each optional device connected to the MFP 150 and each application installed on the MFP 150. It may be useful to create dedicated vendor management tables for the MFP 150, the optional device, and the application. The product model management table 301 illustrated in FIG. 4B is a table that is used by the device configuration management module 209 to manage product information about the MFP 150. For example, the information managed by the product model management table 301 includes a product model identifier, a vendor identifier, a product identification name, and a firmware version. The product model identifier is an identifier that uniquely identifies each product model.

The application management table 302 illustrated in FIG. 4C is a table that is used by the device configuration management module 209 to manage information about each application installed in the MFP 150. For example, the information managed by the application management table 302 includes an application identifier, an application name, a vendor identifier, and a version. The application identifier is an identifier that uniquely identifies each application. Further, the vendor identifier (i.e., "VENDOR IDENTIFIER" in the vendor management table 300) is an identifier that is used for association of the vendor information.

The optional device management table 303 illustrated in FIG. 4D is a table that is used by the device configuration management module 209 to manage information about each optional device connected to the MFP 150. For example, the information managed by the optional device management table 303 includes an optional device identifier, a vendor identifier, and an optional product name. The optional device identifier is an identifier that uniquely identifies each optional device. Further, the vendor identifier (i.e., "VENDOR IDENTIFIER" in the vendor management table 300) is an identifier that is used for association of the vendor information.

FIGS. 5A and 5B are diagrams illustrating table configuration examples of a script management table and a device management table, respectively. A script management table 304 illustrated in FIG. 5A is a table that is used by the web scraping management module 207 to manage a script including a description of an operation command that causes the web scraping management module 207 to perform web scraping processing for the MFP 150. For example, the information managed by the script management table 304 includes a script identifier, a script name, a product model identifier, an optional device identifier, an application identifier, and script data.

The script identifier is an identifier that uniquely identifies each script. The product model identifier (i.e., "PRODUCT MODEL IDENTIFIER" in the product model management table 301) is an identifier that is used for association of the model information about the MFP 150. The optional device identifier (i.e., "OPTIONAL DEVICE IDENTIFIER" in the optional device management table 303) is an identifier that is used for association of the information about an optional device connected to the MFP 150.

The application identifier (i.e., "APPLICATION IDENTIFIER" in the application management table 302) is an identifier that is used for association of information about each application installed in the MFP 150. The script data is information indicating a path on the file server module 203 that stores a file substance of the script. Alternatively, the database server module 202 stores each script file as a file having a binary data format. Further, the database server module 202 can manage various scripts. It is not always required to use a single binary data format to manage each script.

It is assumed that constituent component information (e.g., network device, optional device connected to the network device, and installed applications) as well as script data corresponding to each constituent component are registered beforehand in the script management table 304.

The device management table 305 illustrated in FIG. 5B is a table that is used by the management application 200 to manage information relating to the MFP 150. For example, the information managed by the device management table 305 includes a network device identifier, a device name, a user account, a password, a product model identifier, and an optional device identifier. Further, the information managed by the device management table 305 includes an application identifier, an IP address, an HTTP port number, a serial number, and a latest search date and time.

The network device identifier is an identifier that uniquely identifies the MFP 150. The product model identifier (i.e., "PRODUCT MODEL IDENTIFIER" in the product model management table 301) is an identifier that is used for association of the model information about the MFP 150. The user account is log-in information required in user authentication for the MFP 150 and is the name of a user who is authorized to log in the MFP 150. Further, it is assumed that the password is used in the user authentication.

The optional device identifier (i.e., "OPTIONAL DEVICE IDENTIFIER" in the optional device management table 303) is an identifier that is used for association of information about each optional device connected to the MFP 150. The application identifier (i.e., "APPLICATION IDENTIFIER" in the application management table 302) is an identifier that is used for association of information about each application installed on the MFP 150. The latest search date and time is information about a latest date and time of when the search module 206 of the management application 200 has searched for the MFP 150.

FIGS. 6A to 6C are diagrams illustrating table configuration examples of a web scraping task management table, a web scraping task execution result management table, and a web UI information management table, respectively. A web scraping task management table 306 illustrated in FIG. 6A is a table that is used by the web scraping management module 207 to manage task information for performing web scraping processing for the MFP 150. For example, the information managed by the web scraping task management table 306 includes a task identifier, a task name, an execution category, a task execution interval, a next execution date and time, a network device identifier, a next execution script identifier, a task category, and an execution flag.

The task identifier is an identifier that uniquely identifies each task. The execution category designates a task execution interval. For example, the execution category includes routine execution category (e.g., constant time interval, every year, every month, or every week). Further, the execution category includes instant execution (e.g., designated date and time). The task execution interval designates an execution interval of the above-mentioned task. The next execution date and time designates scheduled date and time for a task to be executed next. The task can be executed at a designated date and time.

The network device identifier (i.e., "NETWORK DEVICE IDENTIFIER" in the device management table 305) is an identifier that is used for association of a specific MFP 150. The web scraping management module 207 executes a task for the MFP 150 corresponding to the network device identifier. The next execution script identifier (i.e., "SCRIPT IDENTIFIER" in the script management table 304) is an identifier that is used for association of a script to be used in the next execution. The task category is an identifier that is for determining a web scraping operation content. For example, in a case where a task instructs changing of a device setting value, an identifying mark "WRITE" is designated as the task category. In a case where a task instructs acquiring of setting value information, an identifying mark "READ" is designated as the task category. The execution flag stores state information indicating whether the execution of a task is cancelled by a monitoring task described below. In a case where the execution flag is TRUE, it indicates that the task is to be executed. If the execution flag is FALSE, it indicates that the execution of the task is cancelled.

A web scraping task execution result management table 307 illustrated in FIG. 6B is a table that is used by the web scraping management module 207 to manage task execution result information of when a web scraping task for the MFP 150 is performed. For example, the information managed by the web scraping task execution result management table 307 includes a task execution result identifier, a task identifier, an execution date and time, a task execution result, an execution script identifier, and an execution log data.

The task execution result identifier is an identifier that uniquely identifies each task execution result. The task identifier (i.e., "TASK IDENTIFIER" in the task management table 306) is an identifier that is used for association of task information used in the web scraping processing. The execution script identifier (i.e., "SCRIPT IDENTIFIER" in the script management table 304) is an identifier that is used for associating a script used in the task execution.

The execution log data is a log file to be output when the web scraping processing is performed. According to the present exemplary embodiment, the execution log data indicates a path on the file server module 203 that stores the log file. For example, log information to be output to a log file includes network device information, web UI page transition information, HTML information, each command execution result, various parameters, and script execution error information. The log file may be managed by the database server module 202, instead of using a file format. The database server module 202 may store each log file having a binary data format in a database. Further, the database server module 202 may manage various log data, and it is not always required to use a single binary data format to manage each log file.

A web UI information management table 308 illustrated in FIG. 6C is a table that is used by the web scraping management module 207 to manage information about a web UI acquired when a web scraping task for the MFP 150 is performed. For example, the information managed by the web UI information management table 308 includes a web UI information identifier, web UI hierarchy data, web UI HTML data, and a web UI information acquisition date and time.

The web UI information identifier is an identifier that uniquely identifies web UI information. The web UI hierarchy data is a data file that records hierarchy information about each page recorded when the web scraping processing is performed. According to the present exemplary embodiment, the web UI hierarchy data includes URL information about each page of the web UI and URL information about another page having associated with the URL. HTML information about each page acquired when the web scraping processing is performed is managed in the web UI HTML data. The HTML information includes information about each page (e.g., HTML character string, image information, and external file information about each page).

FIGS. 7A and 7B are diagrams illustrating table configuration examples of a web UI monitoring task management table and a web UI monitoring task execution result management table, respectively. A web UI monitoring task management table 309 illustrated in FIG. 7A is a table that is used by the web scraping management module 207 to manage task information of when a web UI monitoring task for the MFP 150 is performed. For example, the information managed by the web UI monitoring task management table 309 includes a monitoring task identifier, an execution category, an execution interval, a next execution date and time, a network device identifier, a next execution script identifier, a monitoring area path, monitoring area coordinates, a monitoring keyword, a relevant task identifier, and a notification level.

The monitoring task identifier is an identifier that uniquely identifies each monitoring task. The execution category, the execution interval, the network device identifier, and the next execution script identifier are similar to the above-mentioned items in the web scraping task management table 306 and therefore redundant description thereof will be avoided. Although executing of a web UI monitoring task requires a script according to the present exemplary embodiment, a command hard-coded may be executed in a program instead of using the script. Alternatively, any other appropriate means or method for monitoring a change of the web UI is usable.

The monitoring area path indicates an HTML path of a monitoring target web UI page. The monitoring task detects a change of an HTML element after the designated HTML path. The monitoring area coordinates is for holding coordinate information when a monitoring target web UI area is designated by using coordinates on the web UI instead of using the HTML path. The monitoring keyword is designated in a case where monitoring a specific character string in the area is required. For example, a character string "USB" and a character string "valid" in the specific area is monitored, and an area change can be detected if any one of these character strings has been changed. In this case, perfect matching, partial matching, or any other appropriate method is usable to determine a character string change.

Figure 8:
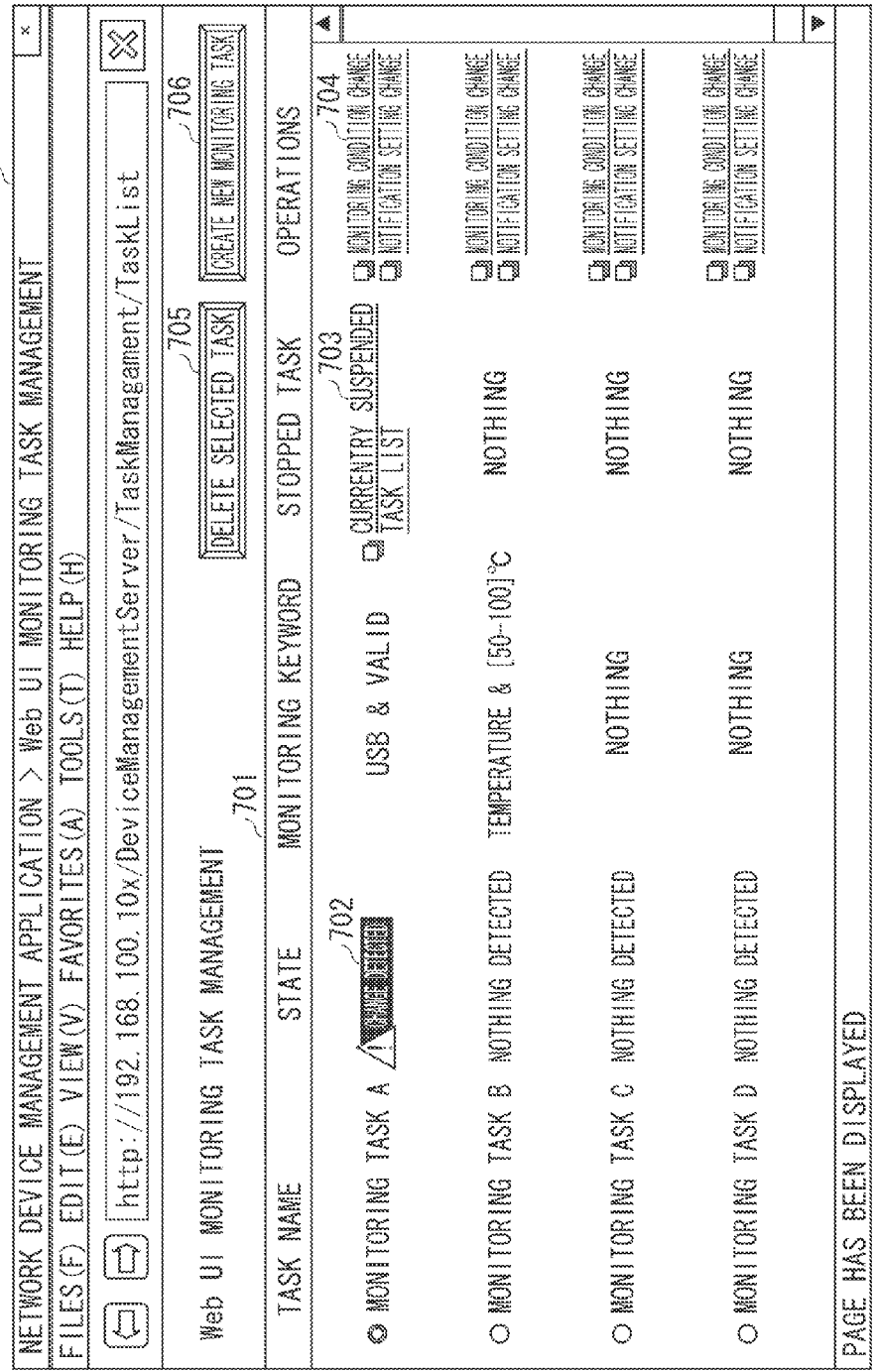
FIG. 8 is a diagram illustrating a monitoring task management screen.

A task identifier of a task to be suspended preferentially when an area change has been detected is designated in the relevant task identifier. The web scraping management module 207 detects a relevant task associated with the task identifier when an area change has been detected. The web scraping management module 207 suspends or executes the detected relevant task. A level to be notified to a user when an area change has been detected is designated in the notification level. A numerical value, a character string, or any other appropriate method is usable to express each level. FIG. 8 is a diagram illustrating an example of a web UI monitoring task management screen.

FIG. 8 illustrates an example of a web browser screen, which includes a task list display area 701 that displays a list of web UI monitoring tasks together with brief information about each monitoring task. For example, the information to be displayed in the task list display area 701 includes a task name, a monitoring task execution state, a monitoring keyword, a suspended task, and various operation links. In a case where any change has been detected in a monitoring area of the target web UI, display indicating that the monitoring area of the target Web UI is changed is performed, in the monitoring task execution state. For example, a decoration using an image and characters highlights a state 702 so that a user is notified of an occurrence of a change. A notification method using a mail or sounds, a notification method using a message displayed on the screen, or any other appropriate notification method is employable.

A task list 703 is a link to a page that displays a list of tasks, displayed through the web scraping, suspended by processing described below. A change operation 704 is a link to a page that is for changing the setting of the notification level to perform notification to a user when any change has been detected in the monitoring area of the monitoring task or on the web UI. Further, it is also feasible to perform other setting change operations. A deletion button 705 is a button for selectively deleting a monitoring task. A creation button 706 is a button for newly creating a monitoring task and for displaying a new monitoring task creation screen.

Figure 9:
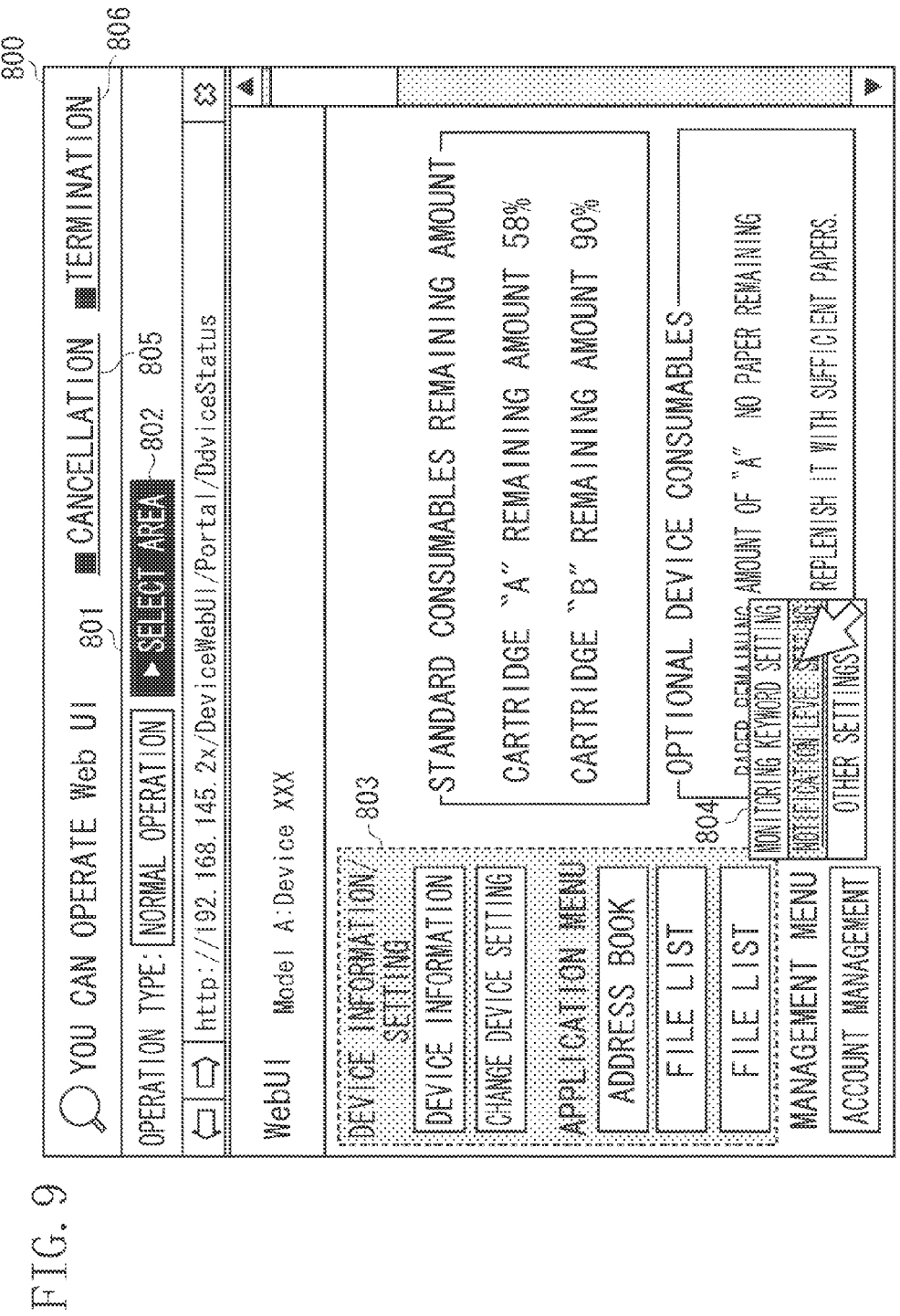
FIG. 9 is a diagram illustrating a new monitoring task creation screen.

Subsequently, FIG. 9 will be described. FIG. 9 is a diagram illustrating an example of a web UI operation screen for the MFP 150 that is displayed when the new monitoring task creation button 706 is clicked on the web browser screen illustrated in FIG. 8. In the screen illustrated in FIG. 9, the web browser 800 records a user's web UI operation for the MFP 150 and creates a web scraping script based on the recorded operation information. At the execution of a monitoring task, the web scraping management module 207 executes the created script and reproduces the user operation, so that shifting to the web UI page including the monitoring area can be performed. For example, the user operation to be reproduced includes a keyboard input operation, a mouse click operation, a file upload operation, and a character string selection operation. The web browser asynchronously transmits the above-mentioned operations to the application server 100. The web scraping management module 207 creates a script based on the operation information. In this case, instead of transmitting the operation information to the application server 100, for example, using an applet or any other appropriate application may be useful for a program cooperated with the web browser to dynamically create a script.

A web browser screen 800 displays an imitated web UI (e.g., a web page) of the MFP 150 in the screen. A web UI screen 801 displays a web UI of the MFP 150 using a script language, such as HTML in-line frame element or Java script (registered trademark), which can be used by the web browser. The web UI screen 801 for the MFP 150 can be displayed as another window. Further, an applet of the web browser is usable to perform display processing and user operation recording processing. For example, the applet includes Adobe Flash (registered trademark), Microsoft Silverlight (registered trademark), Microsoft DirectX (registered trademark), and Java Applet (registered trademark). However, any other appropriate methods are employable to display the web UI for the MFP 150 and record various input operations.

A selection button 802 is a button for switching the monitoring area to a selection mode. The user can select a partial area of the web page by using the selection button 802. More specifically, after a screen is shifted to a monitoring target web UI page through an ordinary web browser operation, a user clicks the selection button 802. Then, a Web UI area desired to be monitored can be changed to a selectable mode by using a rectangular selection, as an area 803. After the user presses the selection button 802, the user can perform a rectangular selection for an area desired to be monitored by a drag operation (e.g., a mouse operation). Alternatively, a flick operation (e.g., a touch panel operation) or any other appropriate means or method is employable for a rectangular selection of a monitoring area. Further, in a case where a user does not perform the above-mentioned rectangular selection, the entire web UI screen being currently displayed can be designated as a monitoring area target. The web browser 800 asynchronously transmits area information about the rectangular selected area (e.g., HTML information and selection coordinates) to the application server 100. The management application 200 which receives the area information stores the received area information via the database server module 202.

A setting menu 804 is a context menu that is displayed after the monitoring area has been selected. The context menu 804 includes links that are displayed to enable a user to set attribute information. For example, the attribute information includes a keyword to be monitored and a notification level to perform notification to the user when a change of the web UI has been detected. As other setting items, registration of a task to be forcedly suspended after a change has been detected or setting of a notification destination may be employable. Any other settings can be performed. A cancel button 805 cancels the creation of a new monitoring task and terminates the processing, when a user clicks the stop button 805. A termination button 806 is a button that is for terminating the web UI operation for the MFP 150 and for registering monitoring task information.

Referring back to FIGS. 7A and 7B, a web UI monitoring task execution result management table 310 illustrated in FIG. 7B is a table that is used by the web scraping management module 207 to manage task execution result information when a web UI monitoring task for the MFP 150 is executed. For example, the information managed by the web UI monitoring task execution result management table 310 includes a monitoring task execution result identifier, a monitoring task identifier, an execution date and time, a monitoring task execution result, and execution log data. The monitoring task execution result identifier is an identifier that uniquely identifies each monitoring task execution result. The monitoring task identifier indicates the monitoring task identifier in the web UI monitoring task management table 309. The information of whether an area change is present is managed in the monitoring task execution result.

Figure 10B:
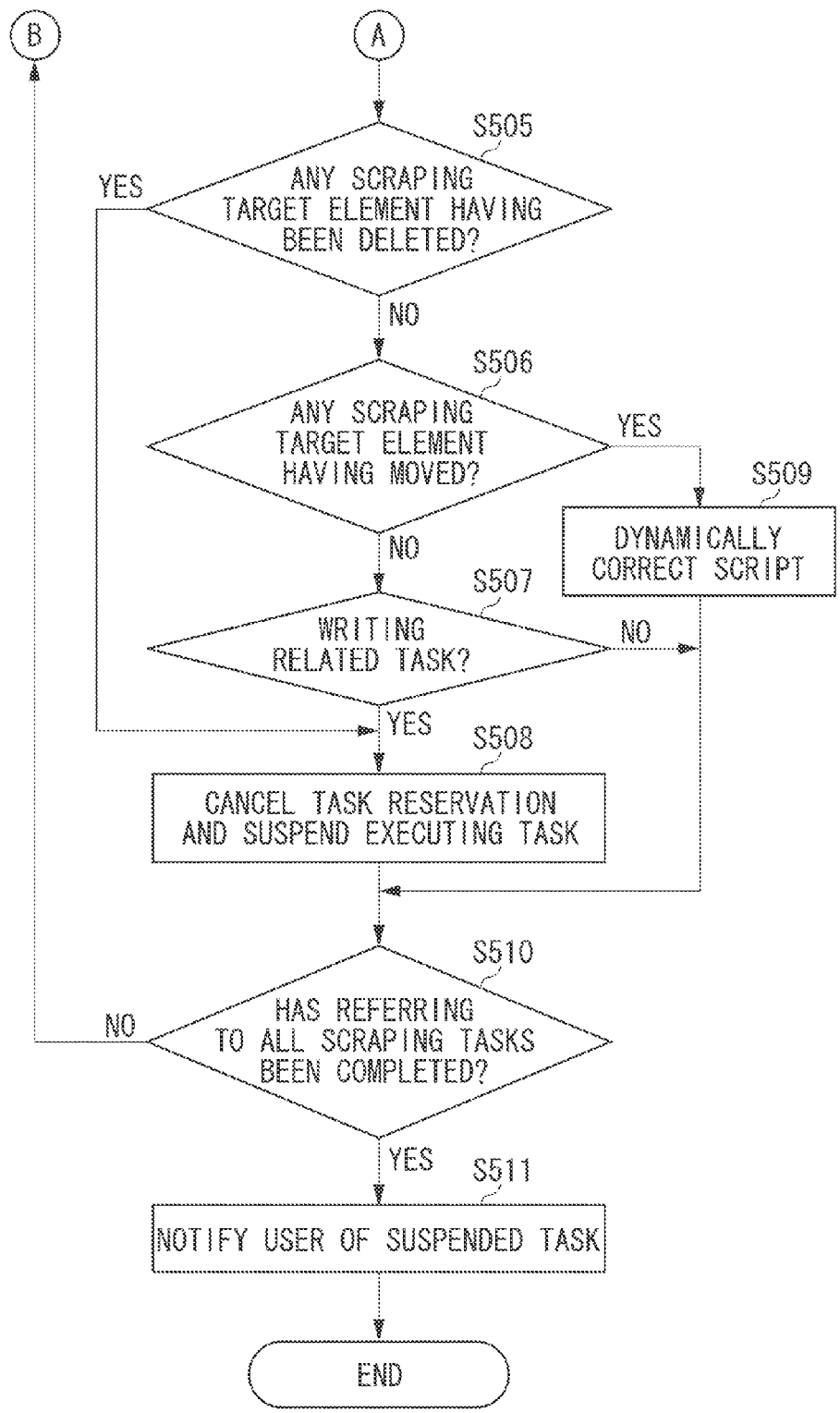

A flow of processing in which the application server 100 monitors a specific area of the web UI for the MFP 150 and dynamically suspends a task that is risky to execute with reference to a change of the web UI will be described in detail below with reference to FIG. 10. In step S500, the web scraping management module 207 of the management application 200 acquires monitoring task information from the web UI monitoring task management table 309 and acquires relevant script information and monitoring target network device information. The above-mentioned acquisition is performed at a reserved execution time or at an arbitrary execution timing.

In step S501, the web scraping management module 207 performs an HTTP communication with the web UI of the MFP 150 according to a command procedure of the script acquired in step S500 or a command procedure incorporated in the management application 200. In this case, in a case where log-in processing or other browsing operation is necessary to use the web UI, accessing to the web UI may be performed by the web scraping. The web scraping command procedure is executed according to a script associated with the monitoring task or a command procedure incorporated in a program.

When the web scraping management module 207 reaches a page that includes a monitoring area, the web scraping management module 207 acquires HTML information about the monitoring area and stores the acquired HTML information in the web UI information management table 308. Further, the web scraping management module 207 acquires past HTML information about the monitoring area from the web UI information management table 308. In step S502, the web scraping management module 207 compares two pieces of HTML information acquired in step S501 and determines whether there is any difference between the present monitoring area HTML information and the previously acquired past HTML information. For example, if the target to be processed is a task indicated by the monitoring task identifier 3 in the web UI monitoring task management table 309, the web scraping management module 207 compares the monitoring area HTML information acquired in step S501 with monitoring area HTML information acquired ten minutes ago. In a case where the web scraping management module 207 determines that there is a difference (YES in step S502), the operation proceeds to step S503. In a case where it is determined that there is not any difference (NO in step S502), the operation returns to step S500. The above-mentioned sequential processing in steps S500 to S502 is performed for each monitoring task of the web UI monitoring task management table 309.

In step S503, the web scraping management module 207 searches the web scraping task management table 306 for a web scraping task that refers to and uses the monitoring area whose change has been detected. Then, the web scraping management module 207 acquires information relating to the task. Determination of whether the task refers to the monitoring area can be performed by determining whether there is a description for referring to the monitoring target area in a script associated with the task. For example, the web scraping management module 207 may perform the determination by searching for a description about the URL or the HTML path of a web page including the monitoring area. However, any other appropriate means or method is employable to determine whether the task refers to the monitoring area.

In step S504, the web scraping management module 207 identifies a change type of the monitoring area. The change type of monitoring area indicates a change type of the HTML structure. FIG. 11 is a diagram illustrating an example of an HTML document for the web UI. The HTML document illustrated in FIG. 11 includes a tag 601 that is referred to as a "li" tag, which is an HTML element that realizes an itemized display of character strings based on a continuous description of "li" tags. In general, the "li" tag is referred to as a block level element, which is a basic element (e.g. caption, paragraph, or table) that constitutes a part of a document, and is recognized by the web browser as a single block. The block level element is not limited to the "li" tag. For example, address, blockquote, center, div, dl, fieldset, form, h1, h6, hr, noframes, noscript, ol, p, pre, table, and ul are other examples of the block level element.

Further, the HTML document illustrated in FIG. 11 includes a tag 602 that can be defined as an in-line element described in the block level element. Thus, a page transition link can be created by using an "a" tag, and a decorative sentence including highlighted characters can be displayed by using a "b" tag. The in-line element is not limited to the "a" and "b" tags. For example, big, br, cite, code, em, font, i, img, input, label, s, select, small, span, strike, strong, sub, and textarea are other examples of the in-line element.

The web scraping management module 207 can identify movement, addition, and deletion of the above-described various setting items on the web UI based on the change type of the monitoring area identified in step S504, which can be performed based on a structure change of the block level element and the in-line element in the monitoring area. In step S505, the web scraping management module 207 determines whether an HTML element required to be referred to in executing the task acquired from the task management table 306 has been deleted from the HTML document of the acquired monitoring area. The determination in step S505 for deletion can be realized by acquiring past web UI data from the web UI information management table 308 of the database server module 202 and comparing the acquired past web UI data with the HTML description. However, any other appropriate means or method is employable to determine whether the HTML element has been deleted. In a case where the web scraping management module 207 determines that the HTML element is not deleted (NO in step S505), the operation proceeds to step S506. In a case where it is determined that the HTML element has been deleted (YES in step S505), the operation proceeds to step S508.

In step S506, the web scraping management module 207 determines whether the HTML element required to be referred to in executing the target task has moved into another web UI area. In a case where the web scraping management module 207 determines that the HTML element has moved (YES in step S506), the operation proceeds to step S509. In a case where it is determined that the HTML element has not moved (NO in step S506), the operation proceeds to step S507.

In step S507, the web scraping management module 207 acquires task category information from the web scraping task management table 306 of the database server module 202 and determines whether the target task is a writing related task or a reading related task.

An example of the writing related task is a web scraping task that changes a device setting value (e.g., a network setting value or a security setting value of the MFP 150). Further, installing or uninstalling an application is another example of the writing related task.

An example of the reading related task is a web scraping task that acquires requisite information (e.g., remaining amount or consumption amount of consumables, security setting values, and print setting values) from the web UI for the MFP 150. Alternatively, other device information may be acquired. As a method for identifying the writing related task, identification of the writing related task may be performed based on preliminarily provided information or based on the description of a script. Alternatively, any other appropriate means or method is employable in the above-mentioned determination.

In a case where the web scraping management module 207 determines that the target task is the writing related task (YES in step S507), the operation proceeds to step S508. In a case where it is determined that the target task is not the writing related task (NO in step S507), the operation proceeds to step S510. In step S508, the web scraping management module 207 updates the execution flag in the web scraping task management table 306 of the database server module 202. Then, the web scraping management module 207 suspends the execution of the task.

In a case where a task desired to be suspended in response to detection of a change is included in the monitoring task, the web scraping management module 207 acquires information about the task to be suspended from the web UI monitoring task management table 309 and the web scraping task management table 306. The web scraping management module 207 may suspend the execution of the task or may perform another associated processing by using the stoppage of the task as a trigger.

If the web scraping management module 207 determines that the HTML element has moved (YES in step S506), then in step S509, the web scraping management module 207 acquires HTML information before and after the detected web UI change from the web UI information management table 308. Subsequently, the web scraping management module 207 corrects the script of the task based on the acquired HTML information. The above-mentioned correction enables the task to be executed by the web scraping even after the web UI has been changed.

In step S510, the web scraping management module 207 determines whether the sequential processing in steps S503 to S509 has been completed for all tasks in the web scraping task management table 306 of the database server module 202. In a case where the web scraping management module 207 determines that the above-mentioned sequential processing has been completed for all web scraping tasks (YES in step S510), the operation proceeds to step S511. If it is determined that the above-mentioned sequential processing is not yet completed for all web scraping tasks (NO in step S510), the operation returns to step S503.

Figure 12:
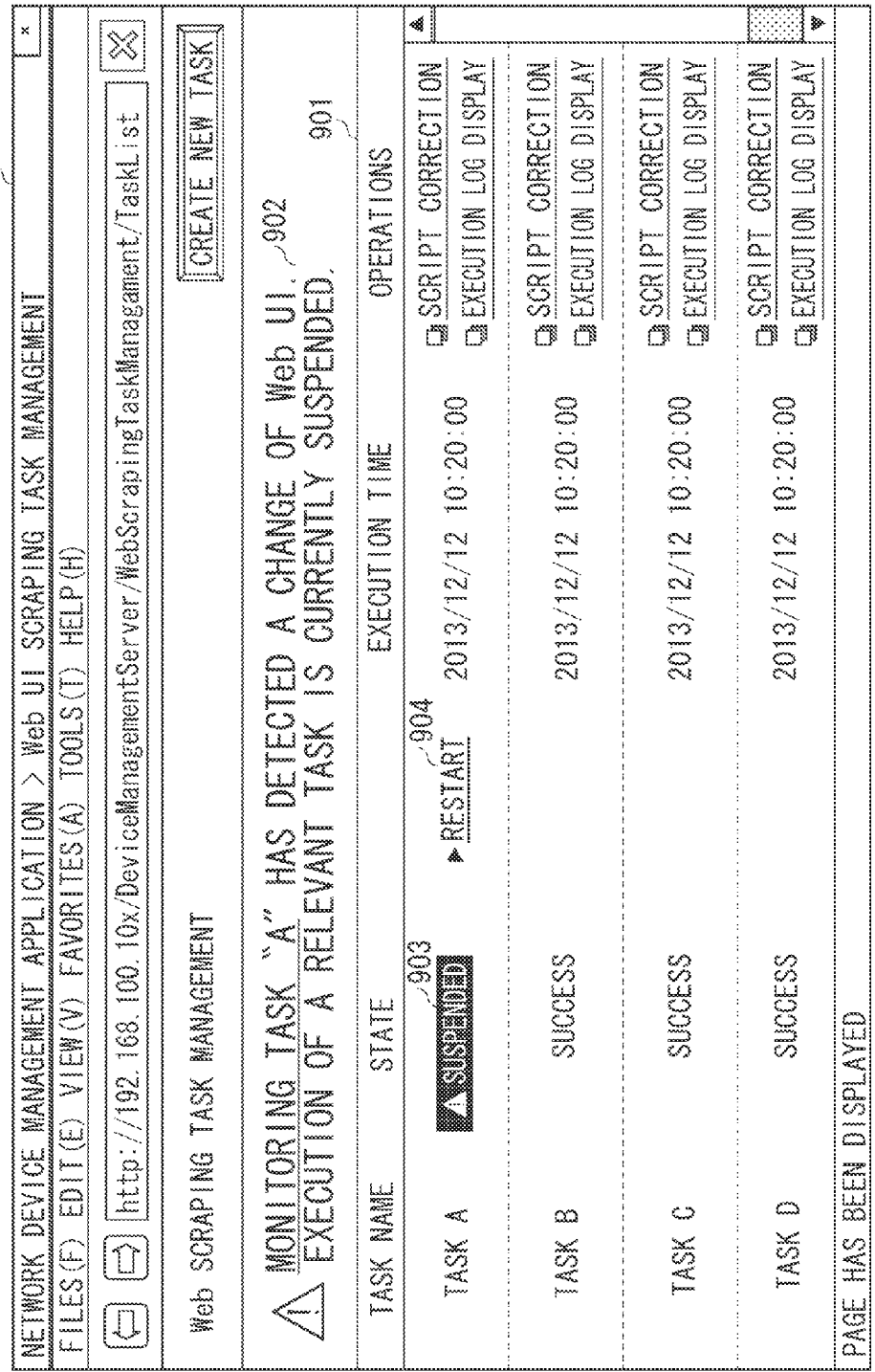
FIG. 12 is a diagram illustrating an example of a screen for notifying that a web UI operation task has been currently suspended.

In step S511, the management application 200 causes the web browser 221 of the client computer 120 to display a notification screen informing that the task has been suspended. FIG. 12 is a diagram illustrating an example of the notification screen.

A web browser screen 900 illustrated in FIG. 12 includes a display area of a web scraping task management screen. A message displayed in a message display area 902 informs that the execution of a task that may be influenced by the execution of a monitoring task is currently suspended. Alternatively, a pop-up display is usable. The message can be displayed on another page. Further, the above-mentioned message can be replaced by any other appropriate notification using sounds and/or images.

An area 901 is an area in which a list of web scraping tasks is displayed. The information displayed in the area 901 includes an execution result and an execution time of each task as well as a link for script correction and a link to a screen for displaying an execution log. A link for task related information or a link for another operation to be performed may be also displayed.

An area 903 is an area in which a task being in an execution suspended state is displayed. A message informing that the task is currently suspended is displayed in the area 903. A restart button 904 is a button for restarting the task. The currently suspended task is restarted when the restart button 904 is pressed. Alternatively, any other appropriate means or method is employable to restart the task.

The notification screen is displayed by the web browser 221 of the client computer 120 that is connected to the management application 200. However, in a case where the web browser 221 has not been activated, the notification screen may be displayed at the next activation timing of the web browser 221. Further, any other appropriate means or method (e.g., mail transmission) is employable to perform the notification for a registered user.

As mentioned above, when the configuration of a web UI for a network device has changed, the application server according to the present invention can appropriately control a task related to the network device according to changed contents. The management application 200 detects a change of the web UI for the MFP 150 and stops a web scraping task that is risky to execute with reference to the type of the detected change. Further, the management application 200 can continuously execute the web scraping task by correcting the script if necessary.

According to the first exemplary embodiment, the management application 200 detects a change of the web UI and stops each web scraping task that is risky to execute with reference to the type of detected change. According to a second exemplary embodiment, in addition to the processing described in the first exemplary embodiment, a method for suspending a web scraping task that is risky to execute with reference to a task influence degree for a monitoring area will be described.

System configuration, hardware configuration, and software configuration of a system according to the second exemplary embodiment are similar to those described in the first exemplary embodiment (see FIGS. 1, 2, and 3) and therefore redundant description thereof will be avoided.

Figure 13B:
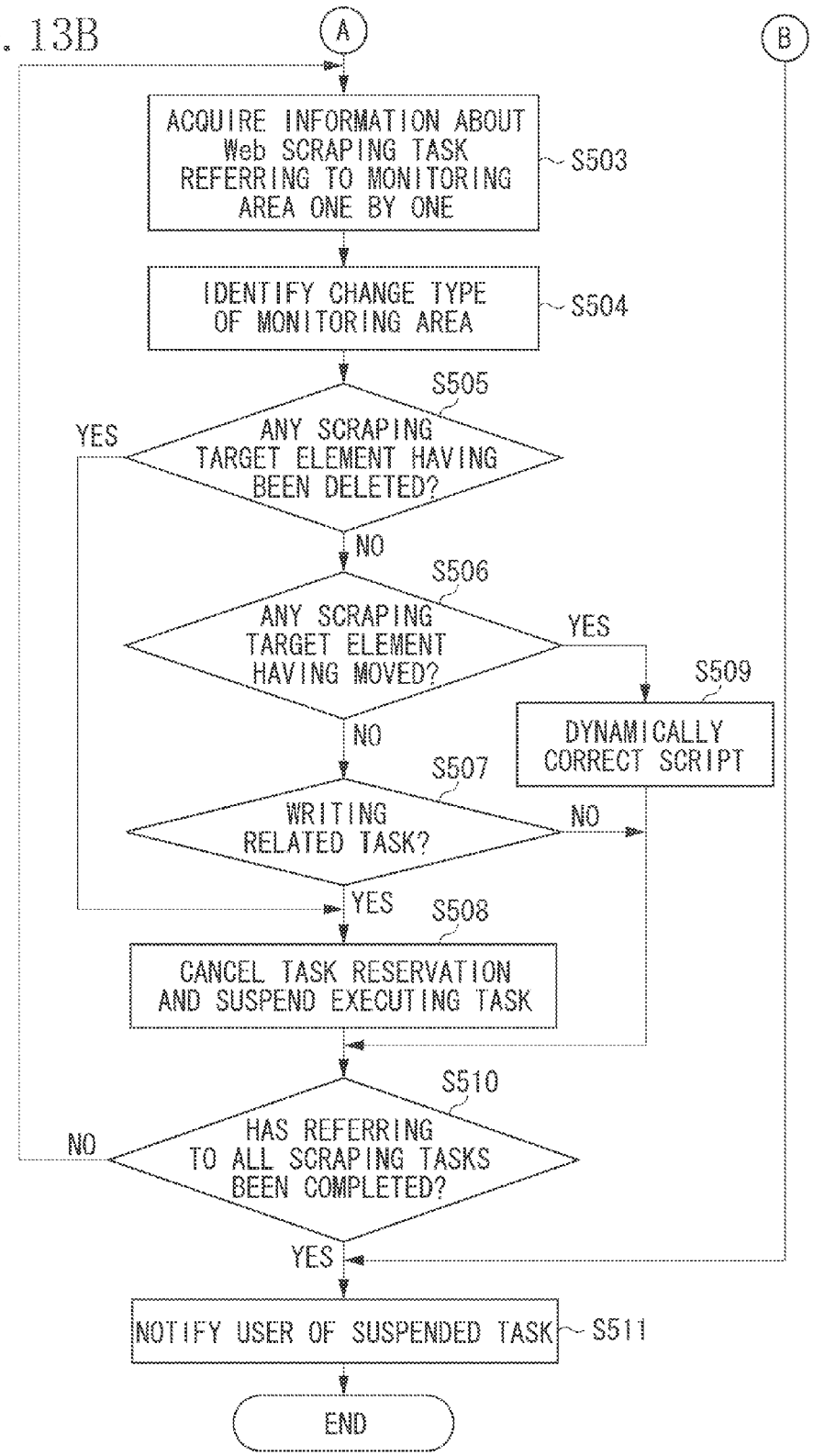

Hereinafter, an operation that is performed by the management application 200 to suspend a web scraping task that is risky to execute with reference to the task influence degree for a monitoring area after a change of the web UI for the MFP 150 has been detected will be described with reference to FIG. 13. Redundant description of each step similar to that already described in the first exemplary embodiment (see FIG. 10) will be avoided.

In steps S500, S501, and S502, the web scraping management module 207 sets a monitoring task for monitoring a specific area of the web UI and detects a change of the web UI.

In step S520, the web scraping management module 207 calculates a task influence degree of a change detected area. The task influence degree is an index indicating a rate of web scraping tasks that may not be executed normally due to the change of the web UI. For example, in a case where a specific web UI area has changed, the task influence degree of the specific web UI area is higher if the area is referred to by a greater number of web scraping tasks and is lower if referred to by a smaller number of web scraping tasks. The calculation formula for calculating the task influence degree is as follows:

$$\text{Task influence degree of area } A = \sum_{k=1}^{n} \frac{\text{Number of times area } A \text{ has been referred to by } task_k \text{ during predetermined period}}{\text{Number of times } task_k \text{ has been executed during predetermined period}} \quad (1)$$

The task influence degree can be calculated by a summation of divisors that are obtained by dividing the number of times the specific area has been referred to by each task during a predetermined period by the number of times each web scraping task has been executed during the predetermined period. The log information (e.g., the number of reference times and the number of task execution times) can be acquired from the execution log data in the web scraping task execution result management table 307 of the database server module 202 and the like. Further, in a case where a bias value representing the degree of task importance and the like is set by a user for each web scraping task, a task influence degree reflecting the user setting may be calculated by multiplying the bias value with the task influence degree.

In step S521, the web scraping management module 207 determines whether the task influence degree is greater than a threshold value based on the task influence degree calculated in step S520. The threshold value is a value defined beforehand by a program or may be a value having been arbitrarily set by a user. For example, the notification level setting value in the web UI monitoring task management table 309 of the database server module 202 can be used as the threshold value of the task influence degree. Any other appropriate method is usable to set the threshold value. In a case where the web scraping management module 207 determines that the task influence degree is greater than the threshold value (YES in step S521), the operation proceeds to step S503. In a case where the web scraping management module 207 determines that the task influence degree is not greater than the threshold value (NO in step S521), the operation proceeds to step S511. Processing to be performed in step S503 and subsequent steps is similar to the processing described in the first exemplary embodiment (see with reference to FIG. 10) and therefore redundant description thereof will be avoided.

Through the above-mentioned processing, the management application 200 detects a change of the web UI for the MFP 150 and suspends a web scraping task that is risky to execute with reference to the task influence degree of a changed area. Further, combining the above-mentioned processing with the processing for suspending a task according to a change type of web UI described in the first exemplary embodiment is useful because the management application 200 can appropriately suspend only the task that is risky to execute without stopping the web scraping task unnecessarily.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105626, filed May 21, 2014, which is hereby incorporated by reference herein in its entirety.

What is claimed is:

1. A management apparatus comprising,
    a memory storing instructions for managing a network device; and
    a processor which is capable of executing the instructions causing the management apparatus to:
    manage a script and a task, the script being a command, required for an operation to a network device, via a web page provided by the network device, and the task designating a timing of execution of the script;
    acquire markup language information corresponding to a web page provided by the network device from the network device via HTTP;
    detect whether or not a web page element that is a web scraping target element of the script of the managed task has been deleted, as a change in a configuration of the web page provided by the network device based on a structure change related to tag information included in the acquired markup language information, and
    stop, in a case where the detected change indicates that a web page element that is a web scraping target element of the script of the managed task has been deleted, execution of the script according to the managed task,
    wherein, in a case where the detected change does not indicate that a web page element that is a web scraping target element of the script of the managed task has been deleted and an operation content defined by the script is not writing information to the network device, the execution of the script is not stopped.

2. The management apparatus according to claim 1, wherein the instructions further cause the management apparatus to stop, in a case where the detected change does not indicate that a web page element that is a web scraping target element of the script of the managed task has been deleted and an operation content defined by the script of the managed task is writing information to the network device, the execution of the script according to the managed task.

3. The management apparatus according to claim 1, wherein the instructions further cause the management apparatus to:
    detect whether or not the web page element that is a web scraping target element of the script of the managed task has been moved, as the change in a configuration of the web page provided by the network device based on the structure change;
    in a case where the detected change indicates that the web page element that is a web scraping target element of the script of the managed task has not been deleted but has been moved, correct the script without stopping execution of the script and execute the corrected script according to the timing designated in the task.

4. The management apparatus according to claim 1, wherein the detected change is a change of a partial area of the web page designated by a user according to the managed script.

5. The management apparatus according to claim 1, wherein the instructions cause the management apparatus to acquire markup language information corresponding to a web page from the network device at predetermined intervals.

6. The management apparatus according to claim 1, wherein the instructions cause the management apparatus to detect, when the execution of the script has been stopped, a relevant task relating to the managed task, and stop or execute the detected relevant task.

7. The management apparatus according to claim 1, wherein the instructions cause the management apparatus to, when the execution of the script has been stopped, provide a user with a screen including a task list and a message about the stopped task.

8. The management apparatus according to claim 7, wherein the screen includes the message according to a previously determined notification level.

9. The management apparatus according to claim 1, wherein the instructions cause the management apparatus to: calculate a degree of influence of the detected change on the managed task, and stop, in a case where a calculated influence degree is greater than a threshold value, the execution of the script.

10. A method for controlling a management apparatus, the control method comprising:
    managing a script and a task, the script being a command, required for an operation to a network device, via a web page provided by the network device, and the task designating a timing of execution of the script;
    acquiring markup language information corresponding to a web page provided by the network device from the network device via HTTP;
    detecting whether or not a web page element that is a web scraping target element of the managed task has been deleted, as a change in a configuration of the web page provided by the network device based on a structure change related to tag information included in the acquired markup language information, and
    stopping, in a case where the detected change indicates that a web page element that is a web scraping target element of the script of the managed task has been deleted, the execution of the script according to the managed task,
    wherein, in a case where the detected change does not indicate that a web page element that is a web scraping target element of the script of the managed task has been deleted and an operation content defined by the script is not writing information to the network device, the execution of the script is not stopped.

11. A non-transitory computer readable storage medium storing computer executable instructions that cause a computer to execute a control method, the control method comprising:
    managing a script and a task, the script being a command, required for an operation to a network device, via a web page provided by the network device, and the task designating a timing of execution of the script;
    acquiring markup language information corresponding to a web page provided by the network device from the network device via HTTP;
    detecting whether or not a web page element that is a web scraping target element of the script of the managed task has been deleted, as a change in a configuration of the web page provided by the network device based on a structure change related to tag information included in the acquired markup language information, and stopping, in a case where the detected change indicates that is a web scraping target element of the script of the managed task has been deleted, the execution of the script according to the managed task, wherein, in a case where the detected change does not indicate that a web page element that is a web scraping target element of the script of the managed task has been deleted and an operation content defined by the script is not writing information to the network device, the execution of the script is not stopped.

* * * * *